Feb. 20, 1962  H. WELLSCH  3,021,877
MEANS FOR SERVICING LIQUID-FILLED PNEUMATIC TIRES
Filed Sept. 8, 1959
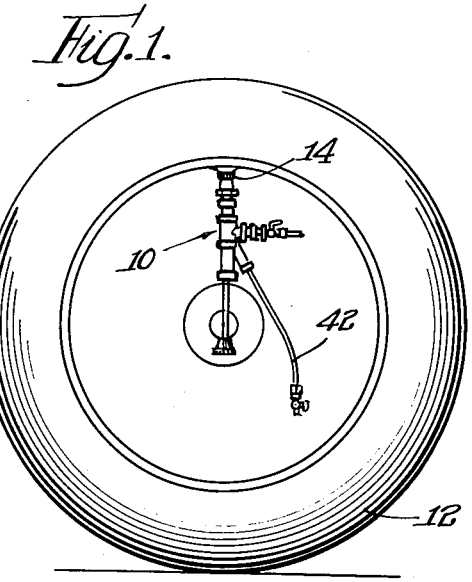
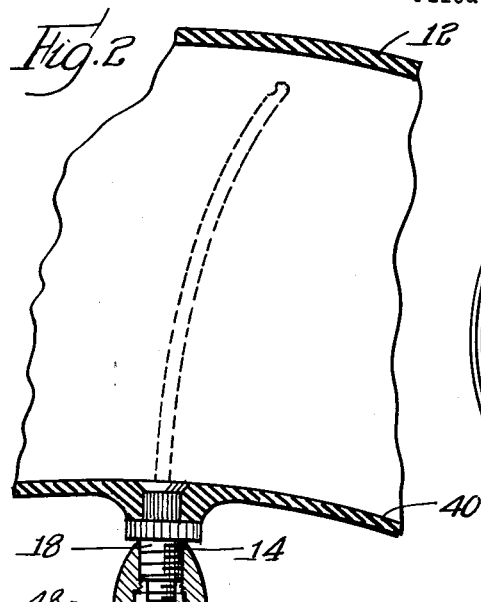
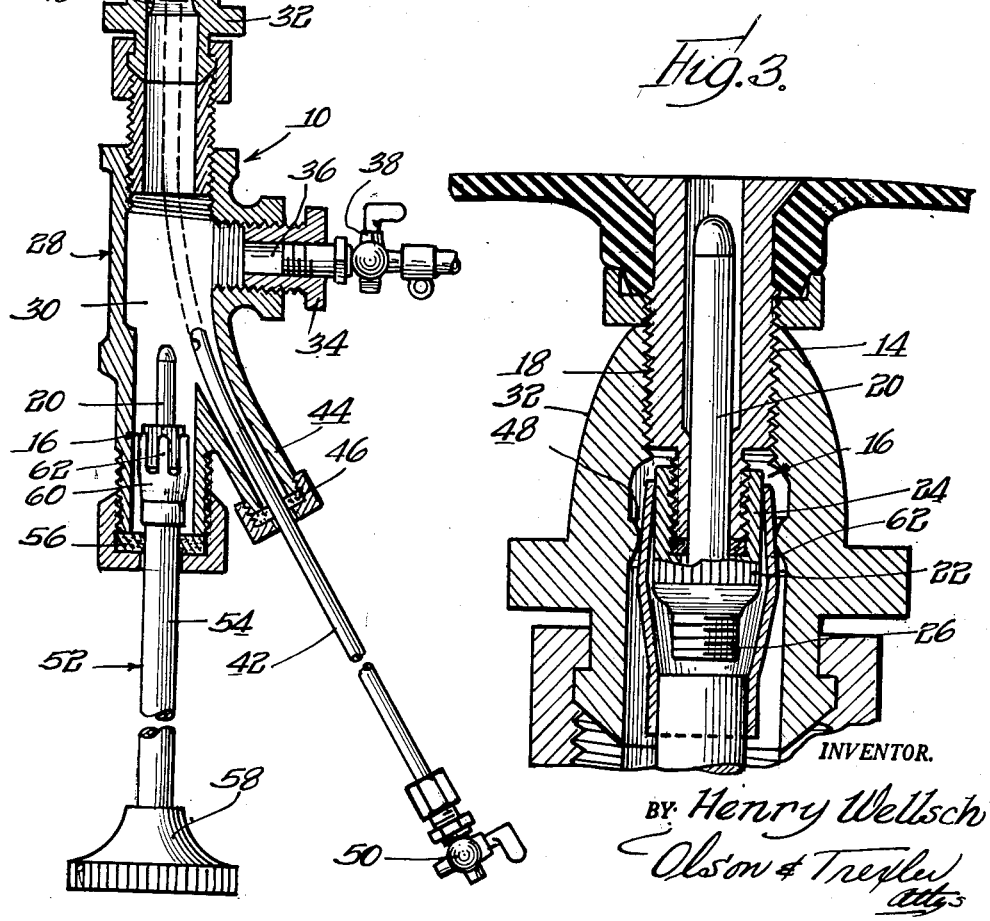
INVENTOR.
BY Henry Wellsch
Olson & Trexler
attys

United States Patent Office 3,021,877
Patented Feb. 20, 1962

3,021,877
MEANS FOR SERVICING LIQUID-FILLED
PNEUMATIC TIRES
Henry Wellsch, Swift Current, Saskatchewan, Canada
Filed Sept. 8, 1959, Ser. No. 838,712
8 Claims. (Cl. 141—38)

The present invention relates to the servicing of pneumatic tires which are sometimes filled at least partially with liquid. Liquid-filled tires are often used on tractors, for example, to add weight which increases the traction of such vehicles.

The servicing of liquid-filled pneumatic tires involves problems and complications not encountered in the servicing of tires filled with air only. As compared to the simple procedure for inflating and deflating a pneumatic tire in which no liquid is used, the matter of filling a pneumatic tire with liquid and withdrawing liquid from a pneumatic tire is a much more complex problem, which can arise many times in the life of a tire.

As a practical matter the problem of filling a pneumatic tire with liquid involves more than simply adding liquid to the tire. Since it is impractical to remove all the air from a tire before introducing liquid into the tire, many advantages are gained by using an air-liquid exchange procedure in which the air in the tire is replaced with liquid. Similarly, the removal of liquid from a tire is accomplished by expelling the liquid with air under pressure.

However, the matter of replacing the air in a pneumatic tire with liquid and vice versa is complicated by the fact that the interior of a pneumatic tire is accessible through only a single opening through the valve stem in which the valve core is normally mounted. Moreover, the matter of working through the valve stem is further complicated by the fact that the air-liquid exchange procedure is carried out under pressure. Other complications arise from the necessity for replacing the valve core after filling a tire with liquid while at the same time maintaining a normal inflating pressure inside the tire. Also, it is desirable that the air-liquid exchange procedure be performed through the valve stem in a manner which provides for complete recovery of liquid forced out of tires containing liqiud antifreeze.

One object of the invention is to provide, for filling a pneumatic tire with liquid under pressure and for removing liquid from a pneumatic tire, an extremely simple and highly efficient air-liquid exchange device which can be easily used in the field to work through the valve stem of a pneumatic tire to replace air in the tire with liquid under pressure or to expel liquid from the tire with air under pressure.

Another object is to provide, for servicing a liquid-filled tire, a new and improved air-liquid exchange device of simple economical construction which provides for removing the valve core from the valve stem of a tire and inserting a discharge tube through the valve stem into the far side of the tire while at the same time providing communication between the interior of the tire and the interior of the device independently of the discharge tube and which provides for removal of the discharge tube from the tire through the valve stem and replacement of the valve core without loss of fluid or pressure from the tire.

Another object is to provide a tire servicing device as recited in the above objects which provides for fully recovering the liquid from a liquid filled tire.

A further object is to provide, for use in servicing a tire adapted to be filled with liquid and having a simple uncomplicated valve core mounted in a very simple valve stem, a novel air-liquid exchange device of remarkably simple construction which can be used with great ease and efficiency for removing the valve core and working through the valve stem to replace air in the tire with liquid under pressure or to expel liquid from the tire with air under pressure and for replacing the valve core in the valve stem at the end of an air-liquid exchange procedure while at the same time serving to maintain any desired internal pressure in the tire from the time the valve core is removed until it is replaced.

Other objects and advantages will become apparent from the following description of the exemplary embodiment of the invention illustrated in the drawings, in which:

FIGURE 1 is a side view showing the tire servicing device embodying the invention connected to a tractor tire in position for replacing air in the tire with liquid under pressure;

FIG. 2 is a longitudinal sectional view of the device as it is attached to the valve stem of a pneumatic tire, shown here in section; and FIG. 3 is a fragmentary sectional view on an enlarged scale showing the tire end of the device connected to a valve stem and conditioned to remove the valve core.

The air liquid exchange device 10 provided by the invention for replacing air in a pneumatic tire 12 with liquid under pressure and for expelling liquid from the tire with air under pressure is adapted for use with conventional sources (not shown) of air and liquid under pressure. The exemplary air-liquid exchange device 10 illustrated is adapted for servicing liquid filled pneumatic tires each of which has a very simple valve stem 14 and a simple valve core 16 removeably mounted on the stem 14 as shown in FIGURE 3.

The valve stem 14 has an externally threaded base 18 somewhat larger in diameter than the maximum diameter of the valve core 16. The valve core itself comprises, as shown in FIGURES 2 and 3, a central elongated check valve element 20 adapted to extend down into the valve stem 14 and connected at its outer end to an enlarged head 22 adapted, as will presently appear, to be grasped by a valve core removing element of the tire servicing device 10. Preferably, the enlarged head 12 includes an internally threaded skirt portion 24 adapted to receive the projecting end of the valve stem 14, which is reduced in diameter in relation to the valve stem base 18 and externally threaded to fit into the internally threaded skirt 24 and provide a support to the valve core.

An externally threaded nipple 26 on the outer end of the valve core head 22 is adapted to receive a valve cap (not shown).

The air-liquid exchange device 10 itself comprises a generally cylinderical, elongated hollow body means 28 defining an internal pressure chamber 30 extending substantially the entire length of the body means.

One end of the body means 28 is joined to a centrally open valve stem coupler 32 which is internally threaded at its outer end to threadedly receive the enlarged threaded base of the valve stem 14 to form a fluid tight connection between the valve stem and the air-liquid exchange device. The internal diameter of the coupler 32 is sufficient to allow the coupler to clear the enlarged head 22 on the valve core 16 as the coupler is moved longitudinally past the valve core head to engage and connect with the threaded base of the valve stem 14.

Provision is made in the construction of the air-liquid exchange device 10 for maintaining the internal pressure within the tire 12 while forcing one fluid medium through the valve stem 14 and simultaneously discharging another fluid medium from the tire through the same stem.

The fluid medium to be injected into the tire is supplied under pressure into the pressure chamber 30 through a fitting 34 on the body means 28 which defines a fluid inlet 36 into the chamber 30 controlled by an inlet valve 38. The inlet side of the valve 38 is connected to a suitable source of air or liquid under pressure.

Fluid admitted to the pressure chamber 30 under pressure is injected through the valve stem 14 into space within the tire 12 immediately adjacent the valve stem.

The tire to be filled with liquid, for example, is positioned rotatably so that the valve stem is located directly above the axis of the tire as shown in the drawings. Hence liquid admitted to the pressure chamber 30 and injected through the stem 14 into the tire as recited gravitates to the bottom of the annular chamber 40 in the tire to displace air in the tire toward the top of the tire chamber. Simultaneously with the injection of liquid into the tire chamber 40 air is discharged through the valve stem 14 from space within the tire chamber 40 located directly across the chamber from the valve stem.

This removal of air from the tire through the valve stem 14 simultaneously with the injection of liquid into the tire through the same valve stem is accomplished by means of a retractable discharge tube 42 forming a structural component of the air-liquid exchange device 10.

The discharge tube 42 is mounted in the body means 28 in a manner which provides for movement of the tube from a retracted position, which provides clearance for operation of a valve core removing element to be described presently, and an advanced position in which the tube extends through the pressure chamber 30 and through the valve stem 14 to reach into space within the tire chamber 40 located directly across the chamber from the valve stem. Structurally, the tube 42 is rather thin and sufficiently small in diameter to pass through the valve stem 14 with sufficient radial clearance between the tube and the inside of the valve stem to provide communication through the stem around the tube between the pressure chamber 30 and the tire chamber 40. Preferably, the tube 42 is formed of metal which provides a flexible tube having a sufficient stiffness to resist bending in normal use.

As shown in FIGURE 2, the discharge tube 42 extends into the pressure chamber 30 through a hollow arm 44 formed on the end of the body means 28 opposite from the valve stem coupler 32 and located laterally to one side of the main portion of the pressure chamber 30 and inclined at a small angle to the axis of the pressure chamber as shown. An annular seal 46 in the outer end of the arm 44 encircles the discharge tube 42 to prevent the escape of fluid from the pressure chamber 30 around the discharge tube while at the same time providing for advancement and retraction of the tube through the seal by a manual force applied to the external end of the tube which extends outwardly beyond the arm 44.

The retracted position of the discharge tube 42 is shown in FIGURE 2. Retraction of the tube to its retracted position removes the tube from the main longitudinal portion of the elongated pressure chamber 30 to provide for unobstructed use of space within the pressure chamber for manipulation of a valve core removing element as will presently appear.

After removal of the valve core 14 in a manner to be described, the discharge tube 42 is advanced from its retracted position shown in solid lines in FIGURE 2 to its advanced or operative position illustrated in phantom in FIGURE 2. The tube is slightly curved as shown so that upon advancement of the tube through the inclined arm 44 and through the main portion of the pressure chamber 30, the inner end of the tube will fit into the projecting end of the valve stem to pass through the stem and reach into the far side of the tire chamber 40. Movement of the tube into the valve stem is guided by an annular protuberance 48 formed on the inside of the coupler 32 to engage the inner end of the tube and guide its movement into the valve stem. The length of the tube 42 is sufficient to extend through the housing means 28 and project beyond the coupler 32 a sufficient distance to reach the far side of the annular chambers of tires to be serviced by the air-liquid exchange device.

A control valve 50 on the outer end of the tube 42 provides a shutoff for preventing the uncontrolled escape of fluid from the tire 12 through the discharge tube.

Provision is made for removing the valve core 16 and retracting the core to an out-of-the-way position out of the path of the discharge tube 42 and for subsequently replacing the core in the valve stem while continuously serving to maintain the internal pressure within the tire and prevent the uncontrolled escape of fluid from the tire.

Thus removal and replacement of the valve core is accomplished by means of a valve core removing element 52 comprising an elongated stem 54 parallel to the elongated body means 28 and extending slidably through a fluid tight seal 56 in the end of the body means opposite from the valve stem coupler 32. A handle 58 on the outer end of the stem 54 provides for convenient manipulation of the valve removing element.

The inner end of the stem 54 supports a valve core grasping element 60 comprising a plurality of circumferentially spaced resilient fingers 62 projecting toward the coupler 32 and adapted upon advancement of the valve removing element toward a valve stem engaged by the coupler 32 to embrace and grasp the enlarged head 22 of a valve core in the valve stem.

As shown in FIGURE 3, the gripping action of the fingers 62 on the skirt 24 of the valve core head 22 is intensified, when the valve removing element is in its fully advanced position, by engagement of the projecting ends of the fingers with the previously mentioned annular protuberance 48 on the coupler 32 which cams the fingers hard against the skirt which is externally serrated to facilitate rotation of the valve core by the gripping element 60.

Thus to remove the valve core 16, the removing element 52 is advanced from the retracted position shown in FIGURE 2 to the advanced position represented in FIGURE 3 to grasp the valve core by means of the opposed fingers 62 as shown in FIGURE 3. Rotation of the core removing element by the handle 58 unscrews the valve core from the valve stem whereupon it is retracted by the element 52 to the opposite end of the pressure chamber 30 out of the path of the tube 42 as shown in FIGURE 2. Replacement of the valve core is effected simply by advancement of the core removing element 52 to fit the core into the valve system and rotation of the element 52 to thread the core onto the stem. All the while the escape of fluid from the tire to the external environment can be precluded simply by closing the valves 38 and 50.

Use of the air-liquid exchange device in the field to service a tire is a very simple matter. To fill a tire with liquid under pressure it is necessary merely to thread the coupler 32 onto the base of a valve stem 14 and manipulate the core removing element 52 to remove the core from the stem, all of which is a very simple matter. The discharge tube 42 is advanced to project through the valve stem 14 and across the tire chamber 40, the tire being positioned rotatably so that the valve stem is at the top of its rotary path as explained. Liquid under pressure is supplied through the inlet 36 and injected through the valve stem into the tire until the tire is filled to the desired degree with liquid. At the same time air is discharged from the tire through the tube 42 as described.

After injecting the desired quantity of liquid into the tire the tube 42 is withdrawn and the valve core 16 replaced as described, whereupon the coupler 32 is unthreaded from the valve stem 14.

The procedure for expelling liquid from a tire with air under pressure is similar to the procedure for filling a tire with liquid except that the tire is positioned so that the stem 14 is located at its lowermost position below the axis of the tire. Air under pressure is supplied to the pressure chamber 30 through the inlet 36 and liquid is withdrawn from the bottom of the tire through the discharge tube 42. If desired the outer end of the tube 42 can be connected to a suitable collecting container to provide for complete recovery of the liquid.

It will be appreciated that the invention is not limited to the precise construction of the illustrated embodiment of the invention disclosed but includes structural variants and alternatives within the scope of the invention as defined by the claims.

The invention is claimed as follows:

1. An air-liquid exchange device for working through the valve stem of a pneumatic tire with the valve core removed to replace air in the tire with liquid or to expel liquid in the tire with air under pressure; said device comprising a single elongated hollow body, coupler means at one end of said body for connecting the same to the valve stem in fixed position during manipulation of the valve core and exchange of air or liquid in the tire, said body having a pair of aperture means extending generally toward said coupler means, a valve core removing element slidably mounted in one of said aperture means and including means engageable with the valve core and an exteriorly accessible operating handle for manipulating said element to remove the valve core from the valve stem along a predetermined fixed longitudinal axis of the body and coupler means to an inoperative position housed within the end of the body remote from said coupler means, means providing a fluid-tight seal between the body and the valve core removing element, a retractable discharge tube slidably extending through the other aperture means in the body for movement between a retracted position out of the path of movement of said valve core removing element along said predetermined fixed longitudinal axis and an advanced position projecting through the coupler means and valve stem with a portion of the tube disposed generally along a portion of the said fixed longitudinal axis within said coupler means from which portion the valve core removing element has been retracted, means providing a fluid-tight seal between said discharge tube and the body, and means on the body forming a liquid supply inlet communicating with the interior of said hollow body for the passage of liquid through the valve stem and around the inserted discharge tube in its advanced position.

2. An air-liquid exchange device as claimed in claim 1, wherein the body is provided with a branch conduit forming the aperture means in which said discharge tube is mounted for its sliding movement between advanced and retracted positions.

3. An air-liquid exchange device as claimed in claim 1, wherein the discharge tube is provided with a control valve at the end thereof exteriorly of said body.

4. An air-liquid exchange device as claimed in claim 1, wherein the axis of the aperture means receiving the valve core removing element is disposed along the central longitudinal axis of the coupler means.

5. An air-liquid exchange device as claimed in claim 4, wherein the axis of the aperture means receiving the discharge tube is slightly inclined with respect to the axis of the other aperture means.

6. An air-liquid exchange device as claimed in claim 5, wherein the inner end portion of the discharge tube is slightly curved to facilitate its passage through the coupler means and valve stem to advanced position.

7. An air-liquid exchange device as claimed in claim 1, wherein the discharge tube is slidable along a slightly curved axis during its movement between advanced and retracted positions.

8. An air-liquid exchange device as claimed in claim 1, wherein the coupler means is provided with guide means engageable with the end of the discharge tube to guide the same into position for passing through the valve stem.

References Cited in the file of this patent

UNITED STATES PATENTS

| | | |
|---|---|---|
| 2,581,914 | Darrow | Jan. 8, 1952 |
| 2,592,759 | Sullivan | Apr. 15, 1952 |

FOREIGN PATENTS

| | | |
|---|---|---|
| 139,849 | Australia | Jan. 15, 1948 |